Oct. 31, 1950     R. M. PAULSEN     2,528,168
METHOD OF MAKING RESIN IMPREGNATED FABRICS
Filed Nov. 10, 1943     2 Sheets-Sheet 2
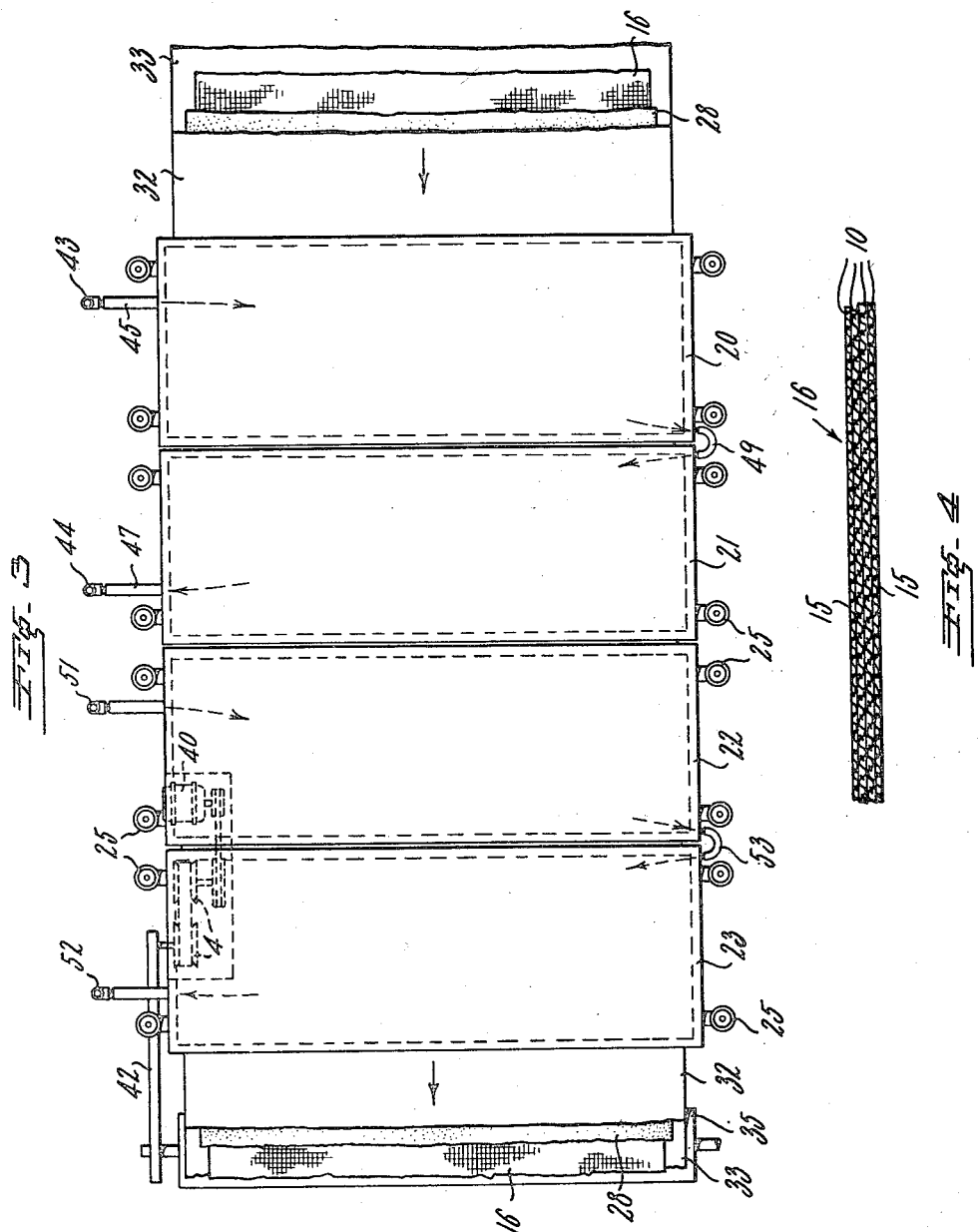
INVENTOR.
ROBERT M. PAULSEN
BY
Lester J. Bredlong
ATTORNEY Patented Oct. 31, 1950

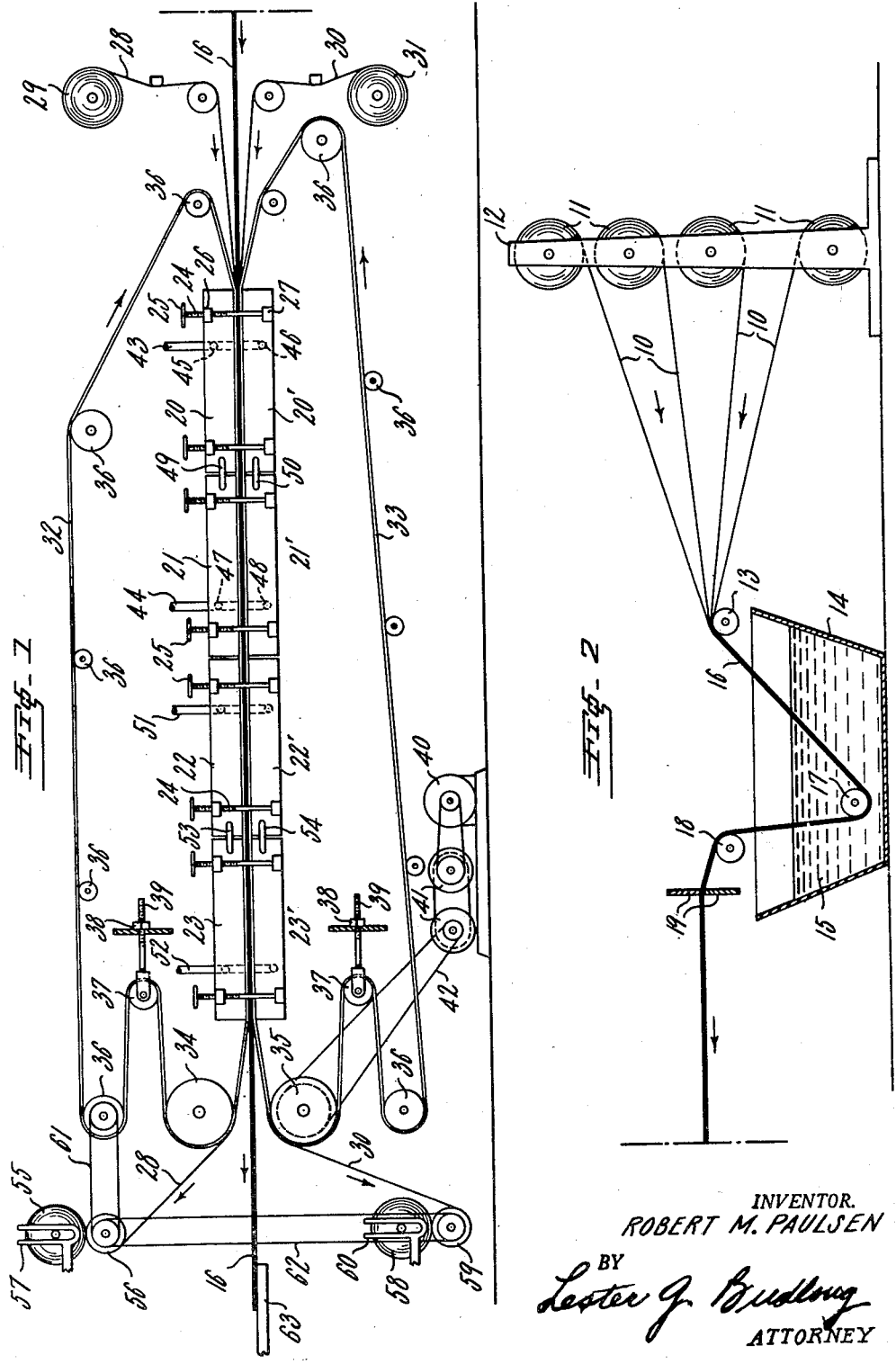

2,528,168

UNITED STATES PATENT OFFICE 2,528,168

METHOD OF MAKING RESIN IMPREGNATED FABRICS

Robert M. Paulsen, Mishawaka, Ind., assignor to United States Rubber Company, New York, N.Y., a corporation of New Jersey Application November 10, 1943, Serial No. 509,750

4 Claims. (Cl. 154—140)

This invention relates to a method of impregnating fibrous sheets with heat hardenable resins to form a relatively stiff sheet material having a hard, tough, non-cracking surface, and more particularly to the method of producing a resin impregnated sheet or resin impregnated laminated sheet by a continuous operation.

In carrying out the present method one or more woven sheets or fibrous sheets are impregnated with synthetic resin of the type which harden to an infusible mass by the application of heat but which evolve heat exothermically in passing from the viscous state to the hard infusible state. This exothermic heat is generated from a reaction within the resin itself, usually in the intermediate gelling stage. Unless this exothermic heat is controlled during the curing of the resin, localized spots may become hot enough to boil and bubble or otherwise cause ununiformity of cure. For brevity, these synthetic resins are referred to herein as reactive exothermic polymerizable resins. They are generally of the character which when undergoing polymerization do not eliminate chemical by-products of reaction, i. e., the polymerized product is composed substantially 100% by weight of all the original ingredients and so are to be distinguished from the phenol-aldehydes and urea-aldehydes and other resins of similar type which in the condensation eliminate water or other materials as by-products.

Typical of resins to be employed in carrying out the present method, but without limitation thereto, are those resins described in U. S. Patent No. 2,273,891 and those referred to in the trade as Columbia resins such as CR–39 and CR–38 and known as allyl resins or allymer resins, which are clear colorless liquids of low viscosity convertible into strong, hard, insoluble, infusible resins when heated in the presence of a catalyst such as benzoyl peroxide. These resins designated by CR–39 and CR–38 are further set forth on page 143 of Plastic Catalog—The 1944 Encyclopedia of Plastics, published by Plastic Catalog Corporation of New York, N. Y. There are also the Laminac resins in the class of unsaturated polyesters, such a Laminac P–4122, an American Cyanamid Company product. Laminac (4122) is further described on page 137 of the above-mentioned publication.

The fact that these reactive exothermic polymerizable resins give off sufficient heat during polymerization to overheat the resins, unless the polymerization is carried out slowly or the heat is dissipated, presents a new problem and makes impractical the methods employed heretofore in coating or impregnating fabrics with the other types of resins such as the phenolic resins.

In practicing the present method the fibrous sheet or sheets which are to be impregnated with a reactive exothermic polymerizable resin are passed through a bath of the liquid resin or otherwise have this resin applied thereto. The treated sheet or laminates are then introduced between covering sheets of Holland cloth, or between impervious sheets of paper having smooth surfaces, or between other covering sheets of impervious material that will not adhere appreciably to the resinous material when cured. The resin treated sheet or laminates, while disposed between these covering sheets, are advanced between slightly spaced pairs of heated platens to thereby polymerize the resin into a gel and then cure the gel into a hard, tough, and durable solid. An extremely important feature of the present method resides in the control of the temperature of the platens between which the resin treated sheet or laminates are advanced, whereby the continuous heat treatment of such sheet or laminates can be carried out at a speed to insure rapid production, such as say 10 inches per minute or higher, without overheating the resinous material during the period that the exothermic heat is produced by the polymerization of the resin.

To take care of this temperature control requirement the pairs of platens, in accordance with the present invention, are disposed only a slight distance apart so that they will be in intimate heat conducting relation with the resin treated sheet or laminates travelling therebetween, and the temperature of the first pair or first two or more pairs of platens is controlled by providing hollow platens through which a heating liquid such as hot water maintained at a predetermined temperature is circulated. This provides for a rapid transfer of heat between the platens and the sheets passing therebetween and in this manner sufficient heat is supplied to the resin treated sheet or laminates to initiate rapid polymerization of the resin, while the circulating liquid will serve also to carry off the added exothermic heat produced as the resin is polymerized. That is, the hot circulating liquid serves to transfer heat rapidly to the resin to initiate polymerization and then to transfer heat rapidly from the resin to prevent burning or overheating of the resin during the polymerization period, so that the heat treatment necessary to first gel and then cure the resin can be carried out rapidly.

After the resin has gelled it is cured by advancing the sheet or laminates between other pair or pairs of platens which preferably are maintained at a higher temperature to effect a rapid cure. The curing of the resin treated sheet or laminated sheet between such platens completes the present method and the covering sheets, above mentioned, may now be stripped from the finished relatively stiff material.

In practice, it is desirable to introduce the fibrous sheet with the resin thereupon and the two covering sheets between advancing runs of two endless aprons which are power driven so that the aprons serve to advance the other sheets between the slightly spaced pairs of platens. The arrangement is preferably such that the lower platens are supported rigidly in a horizontal plane, and the upper platens rest floatingly upon or press against the run of the upper apron with sufficient force to insure an intimate heat conducting relation between the platens and the various sheets passing therebetween. This insures a rapid transfer of heat between the resin treated fibrous sheet or laminates and platens.

The above and other features of the present method will be more fully understood from the following description when read in connection with the accompanying drawings illustrating one form of apparatus for carrying out the method.

In the drawings:

Fig. 1 is a side elevation of the major portions of apparatus for carrying out the method of the present invention, the parts being shown more or less diagrammatically;

Fig. 2 is a similar view of apparatus for supplying several fibrous sheets to a bath of resinous liquid before these sheets are advanced to the apparatus of Fig. 1 being in fact a continuation of that part of the apparatus shown in Fig. 2;

Fig. 3 is a top plan view of the major portion of the apparatus shown in Fig. 1, the apron mechanism above the upper platens being omitted; and Fig. 4 is an enlarged transverse sectional view of the finished resin-impregnated laminated sheet.

The resin impregnated sheet material produced in a continuous operation by the present method, may, as above stated, consist of a single sheet of woven fabric or other fibrous material impregnated, as herein contemplated, or two or more such sheets laminated together and impregnated in a single operation with such resinous material. In the construction shown in the drawings a four-ply laminated sheet is being produced.

As shown in Fig. 2, four sheets 10 of woven material are advanced in the direction indicated by arrows from the supply rolls 11 which are supported one above the other by the uprights 12. These sheets 10 may all be formed of the same material or they may be formed of two or more different materials, as desired. For example if a resin treated laminated sheet having high tensile strength is desired, the outer sheets 10 may be formed of woven fiber glass cloth. The sheets 10 are pulled forward, by means to be described, from the supply rolls 11 so that they contact each other and form a laminated sheet as they travel over the idler roll 13 disposed above one edge of the tank 14. This tank contains the above mentioned reactive exothermic resin 15 having a catalyst mixed therewith. The laminated sheet or laminates 16 formed of the four sheets 10 passes from the roll 13 downward within the tank 14 and about the roll 17 disposed below the level of the resinous material 15 to thereby saturate the sheet 16 with this material. The sheet 16 passes upwardly about the idler roll 18 and then between the wipers 19 which serve to remove the excess resinous material from the outer surfaces of the sheet 16 so that this excess material may drain back into the tank 14. This saturated sheet 16 then travels in a horizontal direction towards the pairs of platens shown in Fig. 1.

In the construction shown, four pairs of platens indicated by 20 20', 21 21', 22 22', and 23 23' are provided. The lower platens are supported in a fixed horizontal row by mechanism, not shown. The upper platens are supported so that they will not move horizontally but may be raised and lowered and may, if desired, rest floatingly upon or press upon traveling sheets advanced between the upper and lower platens. As shown, each upper platen is provided at the opposite sides of the machine with the adjustable supporting bolts 24 having a hand-operating wheel 25 at the upper end thereof. Each of these bolts is in threaded engagement with a lug 26 projecting laterally from an end of the upper platen, and the lower end of each bolt rests upon a lug 27 projecting laterally from the lower platen, this being a well known means for raising and lowering an upper platen relative to the lower platen.

Since the resin treated sheet 16 is in a wet tacky condition as it advances towards the platens, it is desirable to cover each tacky face thereof with a sheet having a smooth impervious surface, such, for example, as paper which has been specially treated to give the same a smooth non-absorbing surface. In the construction shown, the upper covering sheet 28 is supplied by the roll 29 and the lower covering sheet 30 is supplied by the roll 31. The arrangement is such that the resin treated sheet 16 and the covering sheets 28 and 30 are drawn forward towards the platens with the sheet 16 sandwiched therebetween. These covering sheets present a smooth surface to each face of the resin treated sheet 16 as the resin becomes set. They also exclude air from the resin impregnated sheet 16 during the gelling and setting period. This is desirable as some reactive exothermic resins do not cure well when exposed to air.

In some applications of the present method it may be desirable to advance the resin treated sheet 16 between the platens by simply exerting a forward pull upon the covering sheets 28 and 30, but in many cases it is desirable to employ endless aprons for this purpose, and permit the entire weight or part of the weight of the upper platens to rest upon these traveling aprons to insure an intimate heat conducting relation therebetween. In the construction shown there are provided the upper endless apron 32 and lower endless apron 33, each being preferably formed of a relatively heavy sheet of canvas or duck. The lower run of the upper apron 32 passes between the pairs of platens above the covering sheet 28, and the upper run of the lower apron 33 passes between the pairs of platens below the lower covering sheet 30. These covering sheets prevent the tack resin from reaching the aprons and also serve to impart a smooth molded surface to each face 15 of the sheet 16 when the resin is cured. The upper apron 32 is driven in the direction shown by an arrow by the positively driven apron engaging roll 34, and the lower apron is driven in the direction shown by an arrow by the positively driven apron engaging roll 35. Each apron travels along the path defined by the spaced idlers 36. The tension of the upper apron 32 and the lower apron 33 is controlled by looping a portion of these aprons about the take-up rolls 37 which are supported by means not shown, for movement along a horizontal path and each is forced in the apron tightening direction by tightening the nut 38 upon the bolt 39. One of these bolts is attached to the bearing at each end of each roll 37.

In the construction shown power for operating the aprons 32 and 33 is supplied by the electric motor 40 conveniently mounted on the floor beneath the machine. This motor drives variable speed mechanism 41, such, for example, as the Reeves variable speed drive, and the roll 35 is driven from the variable speed mechanism 41 by a chain 42. The roll 34 for operating the upper apron may be positively driven by providing a gear connection, not shown, but consisting of one gear secured to the central shaft for the roll 34 and another gear secured to the central shaft for the roll 35. The driving mechanism for the aprons 32 and 33 is such that the resin treated sheet 16 may be advanced between the platens at any desired speed by simply adjusting the variable drive mechanism 41. The speed at which the sheet 16 is advanced between the platens will depend upon the thickness of the laminated sheet 16 and speed at which the resin 15 can be gelled and cured.

As above stated, an extremely important feature of the present invention resides in the control of the temperature of the platens between which the resin saturated sheet 16 is first introduced. In the construction shown the temperature of the first pair of platens 20 20' and second pair of platens 21 21' is controlled by making these platens hollow and by maintaining a flow of hot water at a controlled predetermined temperature through these four platens. This is accomplished by providing a hot water supply pipe 43 at one side of the machine for the platens 20 20' and by providing at the same side of the machine a pipe 44 for carrying off the hot water from the platens 21 21'. The inlet pipe 43 is connected to the upper platen 20 at 45 and to the lower platen 20' at 46, and the outlet pipe 44 is connected to the upper platen 21 at 47 and to the lower platen 21' at 48. The upper platens 20 21 are connected at their ends remote from the pipes 43, 44 by the U-shaped pipe 49, and the lower platens 20' 21' are similarly connected by the U-shaped pipe 50. Since the upper platens, as above stated, are supported for limited adjustment in a vertical direction, the pipe connections for the upper platens should be flexible to accommodate this vertical movement.

The arrangement just described is such that hot water supplied by the pipe 43 will flow entirely across the hollow platens 20 20' to pass through the connections 49, 50 into the platens 21 21' and then flow across these platens in the opposite direction to the outlet pipe 44. This insures a good circulation of the hot water. The pipes 43 and 44 are preferably connected to a water supply tank having an automatic temperature control such as a thermostatic control for maintaining the water at a predetermined temperature, and a pump for forcing the water through these pipes.

By circulating a liquid heating medium through these platens from the inlet pipe 43 to the discharge pipe 44 the temperature of the platens may be accurately controlled even when a large amount of exothermic heat is being produced, since the flow of liquid may be as rapid as required to carry off the excess heat. As a result of this construction the liquid passing successively through the platens serves first to supply sufficient heat to initiate the curing action, and then to carry off the excess heat caused by the exothermic action.

It is found that in operating the illustrated apparatus, as so far described, to advance the sheet 16 slowly between the platents the resin upon this sheet will have gelled by the time it leaves the second pair of platens provided the first and second pairs of platens are maintained near the boiling point of water, and that not much exothermic heat will be produced after the sheet 16 leaves the second pair of platens. Therefore, the temperature of the third and fourth pairs of platens may be increased considerably to speed up the operating of curing the gel. Various means may be employed for heating the third and fourth pairs of platens, steam being well suited for this purpose. To this end in the construction shown the platens 22 22' are connected to the steam supply pipe 51 and the platens 23 23' are connected to the steam discharge pipe 52. The opposite ends of these platens are connected by the U-shaped pipes 53 and 54 similar to the pipe connections 49 and 50. As a result of this construction steam will flow through the third and fourth pairs of platens similar to the manner in which hot water flows through the first and second pairs of platens.

In a machine in actual use and constructed as shown in the drawings each platen is 36 inches wide and 54 inches long so that the sheet 16 in passing between the four pairs of platens travels through a heated area 12 feet long. The temperature of the first and second pairs of platens was maintained at about 200° F. and the third and fourth pairs of platens were maintained at about 260° F. Under these conditions the four ply resin treated sheet 16 cured satisfactorily when advanced at a rate of about 10 inches per minute through the machine of Fig. 1. The sheet 16 upon issuing from the last pair of platens was much stiffer than the individual sheets 10 when plied together but untreated. All four sheets were thoroughly impregnated with the resin material and each face of the laminated sheet 16 had a hard, smooth, nearly crystal clear surface.

The covering sheets 28, 30 which do not adhere firmly to the cured resinous material are easily stripped therefrom. This is accomplished in the construction shown by causing the upper covering sheet 28 to wind upon the take up roll 55 which rests upon the driven roll 56 so that the roll 55 may rise relatively to the guiding mechanism 57 as the size of the roll 55 increases. The lower covering sheet 30 is likewise wound upon the take-up roll 58 which rests upon and is driven by the roll 59, the arrangement being such that the roll 58 may rise relatively to the supporting mechanism 60 as it increases in size. The upper roll 56 is shown as being driven by the chain 61 from the apron driven upper roll 36 and the lower roll 59 is driven by the chain 62 from the roll 56.

While four pairs of platens are shown in the drawing, the number and size of the platens may be varied as desired. If the method of the present invention is employed to treat a single fibrous sheet, or two or three relatively thin fibrous sheets, the finished product may be sufficiently flexible to be wound in a relatively large roll for convenience of handling and storage. If, however, the sheet is a four-ply construction, as shown in the drawings, the finished product will be too stiff to roll and it is therefore desirable to cut the same into slabs as it issues in a continuous sheet from the machine and slides along the supporting table 63.

Since the sheet 16 is impregnated with what is known as a substantially 100% polymerizable low pressure resin, there are no objectionable by-products such as moisture confined between the covering sheets 28 and 30 during the cure, and since it is necessary to exert only a relatively slight pressure upon the resin impregnated sheet 16 during the cure, it is practical to slide this sheet slowly between the successive platens while the resin is being cured. This sliding movement of the sheet 16 between the hot platens serves to iron the sheet and impart to it a smooth surface and a uniform thickness.

By employing the above described method a relatively stiff sheet of any desired size and thickness and having a hard, smooth non-cracking surface may be produced in a continuous operation with a minimum amount of manual labor, and by regulating the temperature of the different platens and the speed of the aprons the cure of the resin may be accurately controlled. Such a sheet after it has been treated as above described is not affected by a wide range of temperature changes; is highly chemically inert, and is well adapted for use to form large durable containers, as a covering for the floors and walls of buildings, to cover desks or table tops and for many other purposes.

Having thus described my invention, what I claim and desire to protect by Letters Patent is:

1. The method of producing by a continuous operation a relatively stiff, resin impregnated, ply sheet having a hard non-cracking resinous surface, which consists in applying to a plurality of fibrous sheets a liquid, reactive, low-pressure, polymerizable, synthetic resin which evolves heat as it undergoes polymerization, plying these sheets together and covering each face of the ply sheet temporarily with a smooth impervious cover sheet, advancing the ply sheet and cover sheets together lengthwise by a sliding movement at a speed of a few inches per minute between successive pairs of slightly spaced flat platens so that the sheets are in intimate heat conducting relation therewith, heating the first pair of platens nearly to the boiling point of water by circulating a liquid therethrough to heat the ply sheet and initiate gelling of the resin, heating the last pair of platens to a higher temperature to further heat the ply sheet and cure the resin, circulating a liquid through an intermediate pair of platens to carry off exothermic heat evolved as the resin is polymerized, and removing the covering sheets from the treated ply sheet.

2. The method of producing by a continuous operation a relatively stiff, resin impregnated, ply sheet having a hard non-cracking resinous surface, which consists in applying to a plurality of fibrous sheets a liquid, reactive, low-pressure, polymerizable, synthetic resin which evolves heat as it undergoes polymerization, plying these sheets together and introducing them between a pair of aprons, advancing the ply sheet and aprons with a lengthwise sliding movement at a speed of a few inches per minute between successive pairs of slightly spaced platens so that the ply sheet is in intimate conducting relation therewith, heating the first pair of platens nearly to the boiling point of water by circulating a liquid therethrough to heat the ply sheet and initiate gelling of the resin, heating the last pair of platens to a higher temperature to further heat the ply sheet and cure the resin, circulating a liquid through an intermediate pair of platens to carry off exothermic heat evolved as the resin is polymerized, and removing the treated ply sheet from between said aprons.

3. The method of producing by a continuous operation of relatively stiff, resin impregnated, ply sheet having a hard non-cracking resinous surface, which consists in applying to a plurality of fibrous sheets a liquid, reactive, low-pressure, polymerizable, synthetic resin which evolves heat as it undergoes polymerization, plying these sheets together and then advancing them along a path formed by several hollow platens so that the platens lie close to and control the temperature of the ply sheet, circulating a heating fluid through the first platen to initiate gelling of the resin, circulating a liquid through a second platen along said path to carry off the exothermic heat and thereby prevent the resin from over heating, and circulating a fluid through a third platen along said path at a higher temperature than the first fluid to cure the resin.

4. The method of producing by a continuous operation a relatively stiff, resin impregnated, ply sheet having a hard non-cracking resinous surface, which consists in applying to a plurality of fibrous sheets a liquid, reactive, low-pressure, polymerizable, synthetic resin which evolves heat as it undergoes polymerization, plying these sheets together, advancing this ply sheet and two thin air-impervious sheets which cover and exclude air from the ply sheet along a path formed by several hollow platens so that the platens lie close to and control the temperature of the ply sheet, circulating a heating fluid through the first platen to initiate gelling of the resin, circulating a liquid through a second platen along said path to carry off the exothermic heat and thereby prevent the resin from over heating, circulating a fluid through a third platen along said path at a higher temperature than the first fluid to cure the resin, and stripping the covering sheets from the hot polymerized resin-impregnated ply sheet.

ROBERT M. PAULSEN.

REFERENCES CITED

The following references are of record in the file of this patent:

UNITED STATES PATENTS

| Number | Name | Date |
|---|---|---|
| 1,308,111 | Porzel | July 1, 1919 |
| 1,361,970 | Dickey | Dec. 14, 1920 |
| 1,519,239 | Clay | Dec. 16, 1924 |
| 1,829,802 | Kliefoth | Nov. 3, 1931 |
| 2,064,162 | Hottel | Dec. 15, 1936 |
| 2,067,580 | Rohm | Jan. 12, 1937 |
| 2,135,763 | Nicholson | Nov. 8, 1938 |
| 2,224,992 | Sutherland | Dec. 17, 1940 |
| 2,264,376 | Hiltner | Dec. 2, 1941 |
| 2,267,470 | Kabela et al. | Dec. 23, 1941 |
| 2,270,285 | Frolich | Jan. 20, 1942 |
| 2,345,013 | Soday | Mar. 28, 1944 |
| 2,348,740 | Jennings | May 16, 1944 |
| 2,414,125 | Rheinfrank, Jr. | Jan. 14, 1947 |

OTHER REFERENCES

Properties of Columbia Resin, Pittsburgh Plate Glass Co., August 10, 1942.

Artificial Resin, Scheiber & Sandig, pub. by Pitman & Sons, London 1931, page 322.